(12) United States Patent
Salter et al.

(10) Patent No.: US 11,951,854 B2
(45) Date of Patent: Apr. 9, 2024

(54) PORTABLE POWER SYSTEMS FOR VEHICLES

(71) Applicant: FORD GLOBAL TECHNOLOGIES, LLC, Dearborn, MI (US)

(72) Inventors: Stuart C. Salter, White Lake, MI (US); Pietro Buttolo, Dearborn Heights, MI (US); Paul Kenneth Dellock, Northville, MI (US); Aaron Gould, Detroit, MI (US); Vivien J. Martinage, Grosse Pointe Farms, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 664 days.

(21) Appl. No.: 16/940,563

(22) Filed: Jul. 28, 2020

(65) Prior Publication Data

US 2022/0032796 A1 Feb. 3, 2022

(51) Int. Cl.
*B60L 50/60* (2019.01)
*B60L 53/20* (2019.01)
*B62D 25/10* (2006.01)
*G05D 1/00* (2006.01)

(52) U.S. Cl.
CPC .............. *B60L 53/20* (2019.02); *B60L 50/60* (2019.02); *B62D 25/105* (2013.01); *G05D 1/0217* (2013.01); *B60L 2210/10* (2013.01)

(58) Field of Classification Search
CPC .......... B60L 53/20; B60L 53/80; B60L 50/60; B60L 50/64; B60L 2210/10; B60L 1/006; B60L 2260/32; B62D 25/105; B62B 5/003; G05D 1/0217
See application file for complete search history.

(56) References Cited

U.S. PATENT DOCUMENTS 3,270,267 A * 8/1966 Nolte, Jr. .................. B60L 1/04
200/51.09
5,301,765 A * 4/1994 Swanson .................. B60K 1/04
180/68.5
6,104,165 A * 8/2000 Miyamoto ............ H01M 10/44
320/136

(Continued)

FOREIGN PATENT DOCUMENTS

CN 1621260 A 6/2005
CN 107039616 A * 8/2017 ............... B60K 1/04

(Continued)

*Primary Examiner* — Steve Clemmons
(74) *Attorney, Agent, or Firm* — David B. Kelley; Carlson, Gaskey & Olds, P.C.

(57) ABSTRACT

This disclosure details exemplary portable power systems for vehicles. The portable power systems may be configured as a secondary battery pack that is removably stored within a front trunk of a vehicle. The portable power systems may include a plurality of individually removable battery units that can be used to extend vehicle driving range or power electrically powered devices that are separate from the vehicle. In some embodiments, when the portable power system is stored in the vehicle and an electrically powered device is connected to the portable power system, the vehicle may be controlled in a Following Mode in which the vehicle is autonomously moved to follow an operator of the electrically powered device.

18 Claims, 8 Drawing Sheets

(56) References Cited

U.S. PATENT DOCUMENTS

| | | | |
|---|---|---|---|
| 6,474,715 B2 * | 11/2002 | Fukushima | B60R 5/04 |
| | | | 296/37.2 |
| 6,575,491 B2 * | 6/2003 | Miller | B62B 5/0003 |
| | | | 280/638 |
| 6,644,707 B2 * | 11/2003 | McLaughlin | B60R 5/041 |
| | | | 296/76 |
| 7,732,948 B2 * | 6/2010 | Caggiano | H01M 50/204 |
| | | | 307/150 |
| 8,229,618 B2 * | 7/2012 | Tolstedt | G05D 1/0231 |
| | | | 701/53 |
| 8,872,474 B2 * | 10/2014 | Scheucher | B60L 53/11 |
| | | | 320/112 |
| 8,989,972 B2 | 3/2015 | Anderson | |
| 8,991,535 B2 * | 3/2015 | Grishashvili | B60K 1/00 |
| | | | 180/68.5 |
| 9,358,895 B2 * | 6/2016 | Avganim | B60K 1/04 |
| 9,395,723 B2 * | 7/2016 | Pari | G05D 1/0255 |
| 9,399,476 B1 * | 7/2016 | Stankevitz | B62B 3/008 |
| 9,643,656 B1 * | 5/2017 | Hall | B60K 15/07 |
| 10,131,373 B1 * | 11/2018 | Ness | B62B 5/0003 |
| 10,183,563 B2 * | 1/2019 | Rayner | B60L 50/64 |
| 10,259,336 B2 * | 4/2019 | McQuillen | B60L 53/63 |
| 10,272,787 B2 * | 4/2019 | Khusravsho | B60K 1/04 |
| 10,293,737 B2 * | 5/2019 | Granell Peniche | B62B 3/025 |
| 10,457,155 B2 * | 10/2019 | Wu | H02J 7/02 |
| 10,507,769 B1 † | 12/2019 | Glickman | |
| 10,509,410 B2 * | 12/2019 | Hammond | G05D 1/0223 |
| 10,981,465 B2 * | 4/2021 | Ishigaki | B60L 50/64 |
| 11,408,498 B2 * | 8/2022 | Weiss | G05D 1/0891 |
| 11,456,605 B2 * | 9/2022 | Bartlett | H02J 50/80 |
| 2003/0209375 A1 * | 11/2003 | Suzuki | B60L 8/003 |
| | | | 180/68.5 |
| 2005/0140159 A1 * | 6/2005 | Barber | B60R 11/00 |
| | | | 296/37.6 |
| 2008/0303248 A1 * | 12/2008 | Chaparro | B62B 5/0003 |
| | | | 280/651 |
| 2009/0101422 A1 * | 4/2009 | Subramanian | B60K 6/48 |
| | | | 296/187.01 |
| 2010/0230188 A1 † | 9/2010 | Nguyen | |
| 2012/0267876 A1 † | 10/2012 | Mazar et al. | |
| 2015/0102627 A1 * | 4/2015 | Pickartz | B60L 53/16 |
| | | | 296/97.22 |
| 2018/0290679 A1 * | 10/2018 | Arai | B62B 3/02 |
| 2019/0070967 A1 † | 3/2019 | Ishigaki et al. | |
| 2019/0286138 A1 † | 9/2019 | Skaaksrud et al. | |
| 2020/0223465 A1 * | 7/2020 | Geffen | B62B 3/027 |
| 2021/0276448 A1 * | 9/2021 | Balasingham | B60L 53/665 |

FOREIGN PATENT DOCUMENTS

| | | | | |
|---|---|---|---|---|
| CN | 207183335 U | | 4/2018 | |
| CN | 109987062 A | * | 7/2019 | |
| DE | 202009010953 U1 | * | 3/2010 | B60K 1/04 |
| DE | 102010022452 A1 | * | 12/2011 | B62B 3/027 |
| DE | 102014006960 A1 | * | 11/2015 | B60L 11/18 |
| DE | 102015214971 A1 | | 2/2017 | |
| GB | 2570870 A | * | 8/2019 | B60L 53/80 |
| JP | 2010058737 A | * | 3/2010 | |
| JP | 2020502646 A | * | 1/2020 | |
| WO | 2002049875 | † | 6/2002 | |
| WO | WO-2011009543 A2 | * | 1/2011 | B60K 1/04 |
| WO | WO-2019007732 A1 | * | 1/2019 | |

\* cited by examiner
† cited by third party

PORTABLE POWER SYSTEMS FOR VEHICLES

TECHNICAL FIELD

This disclosure relates generally to portable power systems for vehicles, and more particularly to portable power systems that include individually removable modular battery units for providing alternative energy storage/power source functionality within vehicles.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on internal combustion engines to propel the vehicle.

Some electrified vehicle customers desire greater control over their vehicle's energy management and usage. This could include the ability to use the vehicle's stored energy for purposes other than propelling the vehicle, such as for powering hand-held tools and other devices at a construction site as part of a Power Generation Mode feature, for example. The stored energy is typically constrained to the vehicle, thereby limiting the portability and overall effectiveness of the energy management functionality.

SUMMARY

A vehicle according to an exemplary aspect of the present disclosure includes, among other things, a front trunk and a portable power system removably positionable within the front trunk. The portable power system includes a tray and a plurality of modular battery units individually removable from the tray.

In a further non-limiting embodiment of the foregoing vehicle, the vehicle is a pickup truck.

In a further non-limiting embodiment of either of the foregoing vehicles, the front trunk establishes a front cargo space of the pickup truck, and a truck bed of the pickup truck establishes a rear cargo space.

In a further non-limiting embodiment of any of the foregoing vehicles, a pivotable grille assembly including a pivotable panel is configured to move between a first position in which the portable power system is enclosed inside the front trunk and a second position in which the portable power system is exposed and removable from the front trunk.

In a further non-limiting embodiment of any of the foregoing vehicles, a power point of at least one of the plurality of modular battery units is exposed when the pivotable panel of the pivotable grille assembly is moved to the second position.

In a further non-limiting embodiment of any of the foregoing vehicles, the vehicle includes a traction battery pack and a bi-directional DC/DC converter electrically connected between the traction battery pack and the portable power system. The bi-directional DC/DC converter is configured to transfer power both from the traction battery pack to the portable power system and from the portable power system to the traction battery pack.

In a further non-limiting embodiment of any of the foregoing vehicles, the bi-directional DC/DC converter is configured to transfer power from the portable power system to an auxiliary battery of the vehicle.

In a further non-limiting embodiment of any of the foregoing vehicles, each of the plurality of modular battery units of the portable power system is individually connected to the bi-directional DC/DC converter.

In a further non-limiting embodiment of any of the foregoing vehicles, the tray of the portable power system includes a spring loaded leg configured to automatically move from a folded position to an unfolded position when the portable power system is removed from the front trunk.

In a further non-limiting embodiment of any of the foregoing vehicles, the tray of the portable power system includes a telescoping handle.

In a further non-limiting embodiment of any of the foregoing vehicles, the spring loaded leg of the tray of the portable power system includes a wheel.

In a further non-limiting embodiment of any of the foregoing vehicles, the portable power system is removable from the vehicle and is insertable into a second front trunk of a second vehicle.

In a further non-limiting embodiment of any of the foregoing vehicles, a control system is located on-board the vehicle and is configured to command the vehicle into a Following Mode in which the vehicle autonomously moves to follow an operator of an electrically powered device that is plugged into the portable power system.

In a further non-limiting embodiment of any of the foregoing vehicles, a tracking system including a first wireless device is configured to communicate with a second wireless device of a mobile device associated with the operator.

In a further non-limiting embodiment of any of the foregoing vehicles, the mobile device is configured to enable the Following Mode through an application stored in a memory of the mobile device.

A method according to another exemplary aspect of the present disclosure includes, among other things, autonomously moving a vehicle to follow an operator of an electrically powered device when the electrically powered device is plugged into a portable power system of the vehicle and when the portable power system is stowed within a front trunk of the vehicle.

In a further non-limiting embodiment of the foregoing method, the vehicle includes a pivotable grille assembly that pivots between a first positon in which a power point of the portable power system is enclosed inside the front trunk and a second position in which the power point is exposed for plugging in the electrically powered device.

In a further non-limiting embodiment of either of the foregoing methods, the vehicle includes a front hood assembly that is movable between a first positon in which the portable power system is enclosed inside the front trunk and a second position in which the portable power system is exposed.

In a further non-limiting embodiment of any of the foregoing methods, the method includes removing the portable power system from the front trunk. Removing the portable power system from the front trunk releases a spring loaded leg of a tray of the portable power system. The spring loaded leg is configured to support the tray above a ground surface.

In a further non-limiting embodiment of any of the foregoing methods, the spring loaded leg includes a wheel configured for rolling the tray along the ground surface.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary portable power systems for vehicles. The portable power systems may be configured as a secondary battery pack that is removably stored within a front trunk of a vehicle. The portable power systems may include a plurality of individually removable battery units that can be used to extend vehicle driving range or power electrically powered devices that are separate from the vehicle. In some embodiments, when the portable power system is stored in the vehicle and an electrically powered device is connected to the portable power system, the vehicle may be controlled in a Following Mode in which the vehicle is autonomously moved to follow an operator of the electrically powered device. These and other features of this disclosure are discussed in greater detail below.

Figure 1:
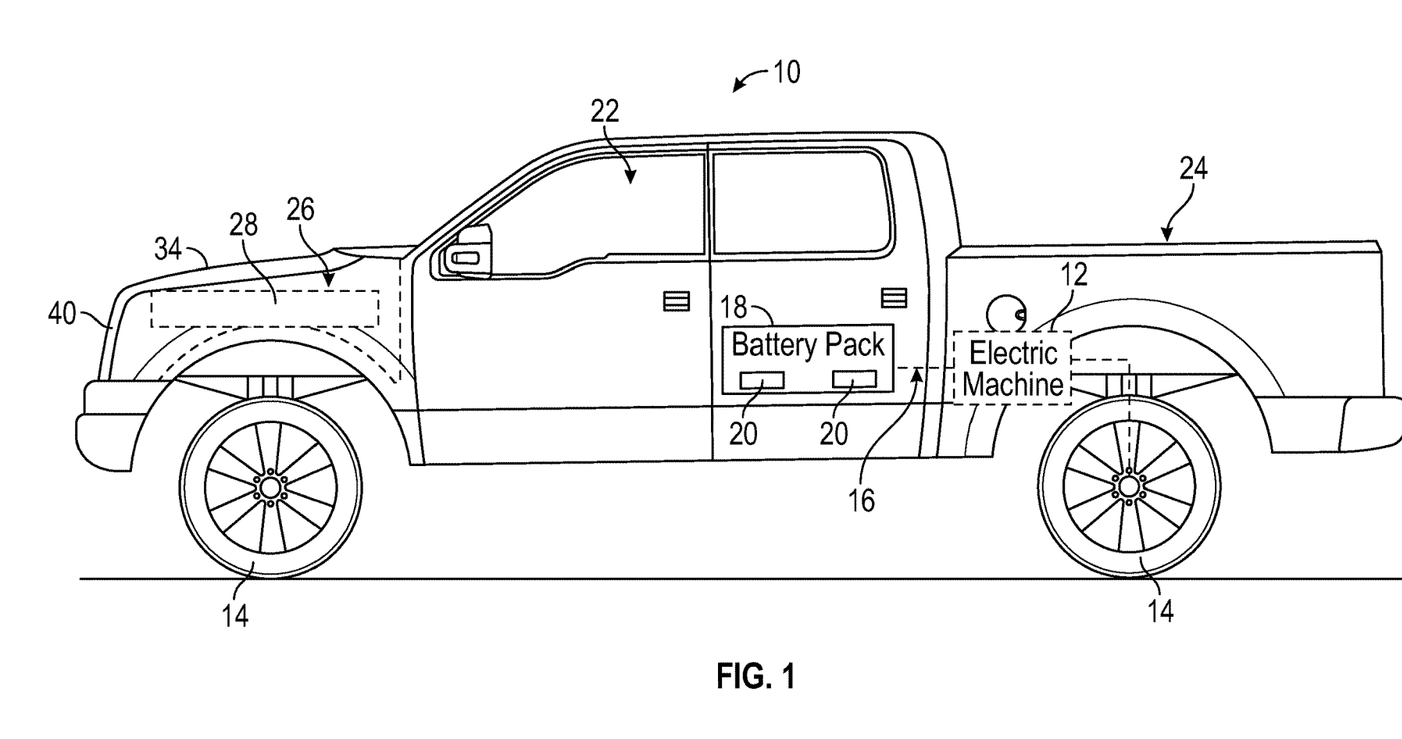
FIG. 1 schematically illustrates an electrified vehicle equipped with a portable power system.

FIG. 1 schematically illustrates an electrified vehicle 10. The electrified vehicle 10 may include any type of electrified powertrain. In an embodiment, the electrified vehicle 10 is a battery electric vehicle (BEV). However, the concepts described herein are not limited to BEVs and could extend to other electrified vehicles, including, but not limited to, plug-in hybrid electric vehicles (PHEV's), fuel cell vehicles, etc. Therefore, although not specifically shown in this embodiment, the electrified vehicle 10 could be equipped with an internal combustion engine that can be employed either alone or in combination with other energy sources to propel the electrified vehicle 10.

Although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily drawn to scale, and some features may be exaggerated or minimized to emphasize certain details of a particular component.

In the illustrated embodiment, the electrified vehicle 10 is a full electric vehicle propelled solely through electric power, such as by one or more electric machines 12, without any assistance from an internal combustion engine. The electric machine 12 may operate as an electric motor, an electric generator, or both. The electric machine 12 receives electrical power and provides a rotational output torque to one or more drive wheels 14, such as through a power transfer mechanism (not shown).

A voltage bus 16 electrically connects the electric machine 12 to a battery pack 18. The battery pack 18 is an exemplary electrified vehicle traction battery. The battery pack 18 may be a high voltage traction battery pack that includes one or more battery arrays 20 (i.e., battery assemblies or groupings of rechargeable battery cells) capable of outputting electrical power to operate the electric machine 12 and/or other electrical loads of the electrified vehicle 10. Other types of energy storage devices and/or output devices can also be used to electrically power the electrified vehicle 10.

In an embodiment, the electrified vehicle 10 is a pickup truck. However, the electrified vehicle 10 could also be configured as a car, a van, a sport utility vehicle, or any other type of vehicle.

In an embodiment, the electrified vehicle 10 includes a passenger cabin 22, a truck bed 24 located to the rear of the passenger cabin 22, and a front trunk 26 located to the front of the passenger cabin 22. The front trunk 26 establishes a first cargo space of the electrified vehicle 10, and the truck bed 24 establishes a second cargo space of the electrified vehicle 10. The front trunk 26 may be referred to more broadly as a front cargo space or by the portmanteau "frunk."

The front trunk 26 provides an additional cargo space not traditionally available in conventional internal combustion powered vehicles. This additional cargo space may be used to store a portable power system 28. As discussed in greater detail herein, the portable power system 28 may be configured as a secondary battery pack that can be used to extend the driving range of the battery pack 18 or power electrically powered devices (e.g., hand-held tools at a construction/work site, e-bikes, e-scooters, etc.) that are separate from the electrified vehicle 10. This disclosure proposes exemplary portable power systems 28 and their respective features and implementations within vehicles.

Figure 2:
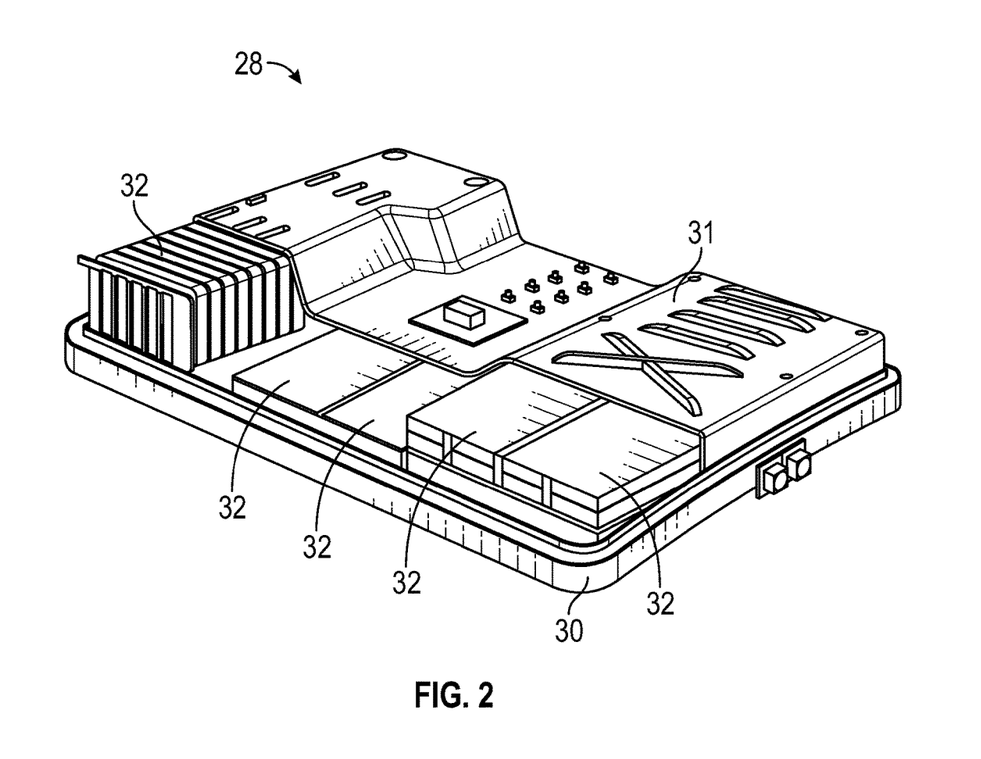
FIG. 2 illustrates an exemplary portable power system for an electrified vehicle.

FIG. 2 illustrates an exemplary portable power system 28 for a vehicle, such as the electrified vehicle 10 of FIG. 1. The portable power system 28 may include a tray 30 and a plurality of modular battery units 32 removably positioned within the tray 30. A cover 31 may optionally cover portions of the portable power system 28. Each of the modular battery units 32 may be stacked together with other modular battery units 32 and is individually removable from the tray 30. In an embodiment, each of the modular battery units 32 is configured as a 12V secondary battery. However, the modular battery units 32 could have the same or different storage capacities, the same or different sizes and shapes, etc. Moreover, the total number of modular battery units 32 provided within the portable power system 28 is not intended to limit this disclosure.

The modular battery units 32 provide portable energy solutions for supporting various mobility applications (e.g., e-Bike, e-scooter, golf cart, etc.) or for powering various electrically powered devices (e.g., hand-held tools at a construction/work site), either while the portable power system 28 is stored within the vehicle or when removed from the vehicle.

Figure 3:
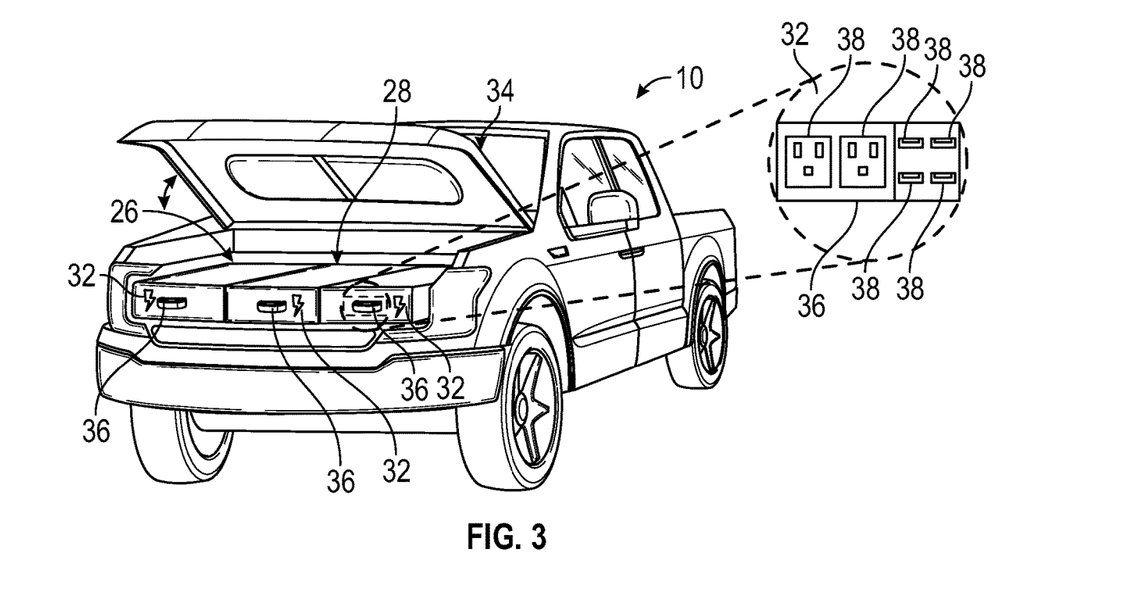
FIG. 3 illustrates a front hood assembly movable to access a portable power system housed within a front trunk of a vehicle.

Referring now to FIGS. 1-3, the front trunk 26 may be selectively covered or uncovered by a front hood assembly 34 of the electrified vehicle 10. The front hood assembly 34 is shown in an open positon in FIG. 3. The front hood assembly 34 may include a hinged cover which, when moved to a closed position, substantially encloses the portable power system 28 within the front trunk 26 (shown schematically with phantom lines). When the front hood assembly 34 is moved to the open position, at least a portion of the portable power system 28 is exposed for accessing one or more of the modular battery units 32 of the portable power system 28. For example, a user may access a power point 36 of one or more of the modular battery units 32 when the front hood assembly 34 is moved to the open position. Each power point 36 may include one or more power outlet ports 38 for connecting electrically powered devices to the modular battery unit 32. The power outlet ports 38 may include 120V outlet ports, 240V outlet ports, USB ports, etc., or any combination of these or other power outlet ports.

Figure 4:
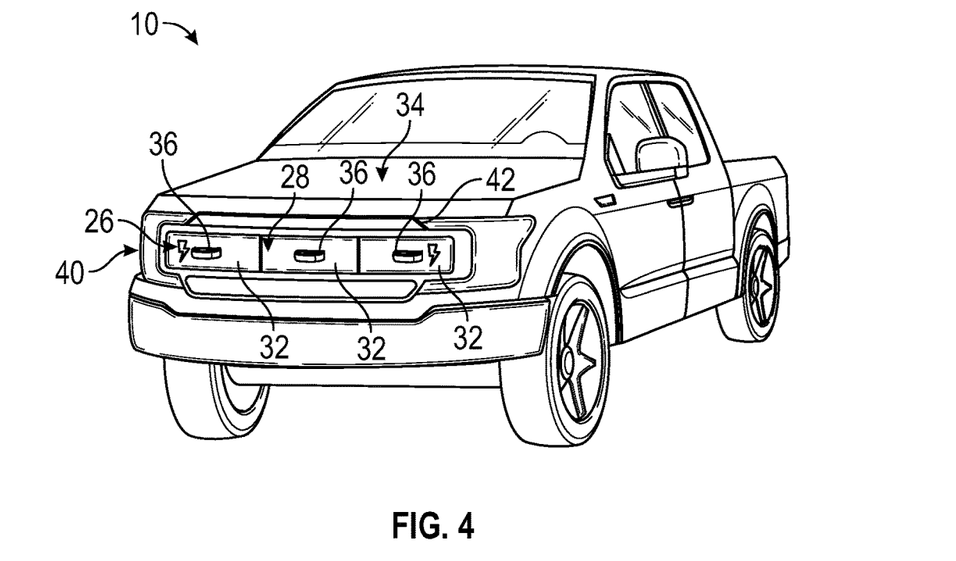
FIG. 4 illustrates a pivoting grille assembly movable to access a portable power system housed within a front trunk of a vehicle.

In another embodiment, shown in FIG. 4, the portable power system 28 may be selectively enclosed or exposed within the front trunk 26 by a pivotable grille assembly 40. The pivotable grille assembly 40 may either be a separate component from the front hood assembly 34 or an integral portion of the front hood assembly 34. The pivotable grille assembly 40 may include one or more pivotable panels 42 that are movable between a closed position (shown in phantom) and an open position relative to the stationary portions of the pivotable grille assembly 40. The pivotable panel 42 may be configured to pivot in any direction. When the pivotable panel 42 is moved to the open position, at least a portion of the portable power system 28 is exposed for accessing one or more of the modular battery units 32 of the portable power system 28. For example, a user may access the power point 36 of one or more of the modular battery units 32 when the pivotable panel 42 is moved to the open position.

FIGS. 3 and 4 illustrate exemplary embodiments in which the portable power system 28 may be accessed to provide power to electrically powered devices separate from the electrified vehicle 10 while the portable power system 28 remains positioned within the front trunk 26. Other embodiments are also contemplated in which the portable power system 28, or portions thereof, are removed from the electrified vehicle 10 for providing power to electrically powered devices separate from the electrified vehicle 10.

Figure 5:
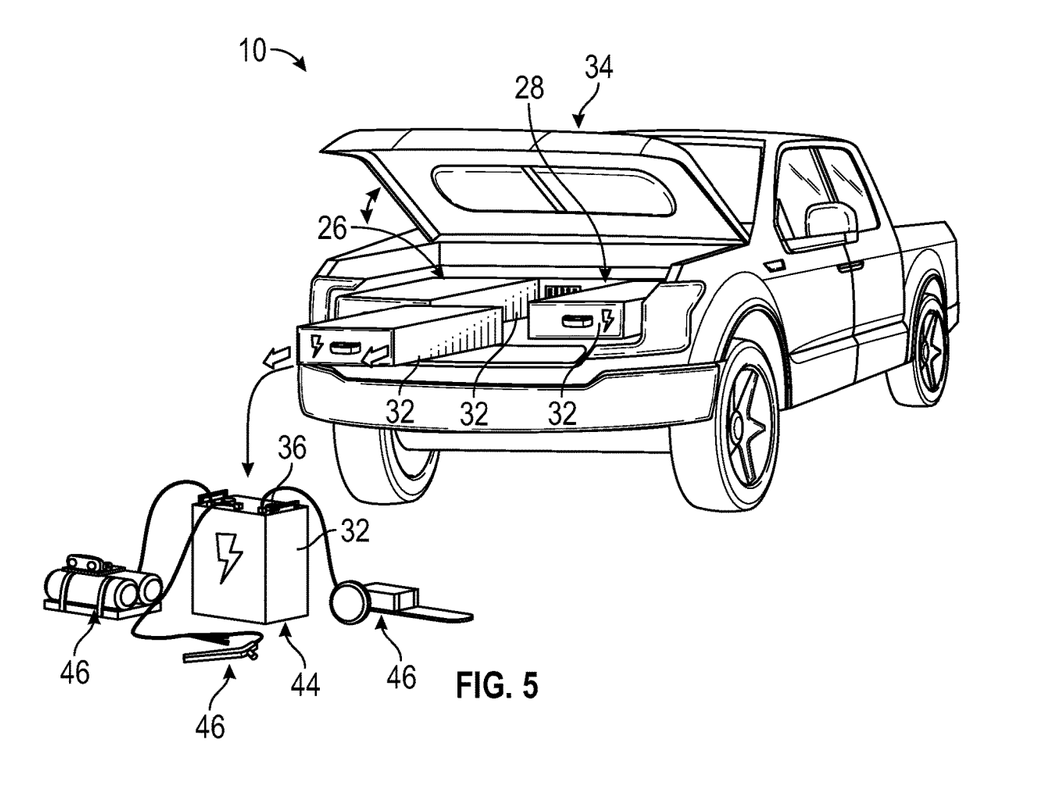
FIG. 5 schematically illustrates removal of a battery unit of a portable power system from a front truck of an electrified vehicle.

For example, as shown in FIG. 5, one or more of the modular battery units 32 of the portable power system 28 may be removed from the front trunk 26 and then positioned on a ground or work surface 44 at a worksite. A user may then plug various electrically powered devices 46 (e.g., saws, drills, or other powered equipment) into the power point 36 of the modular battery unit 32. The modular battery unit 32 is capable of supplying a certain amount of electrical power for powering the electrically powered devices 46 once they are plugged into the power point 36.

Figure 6:
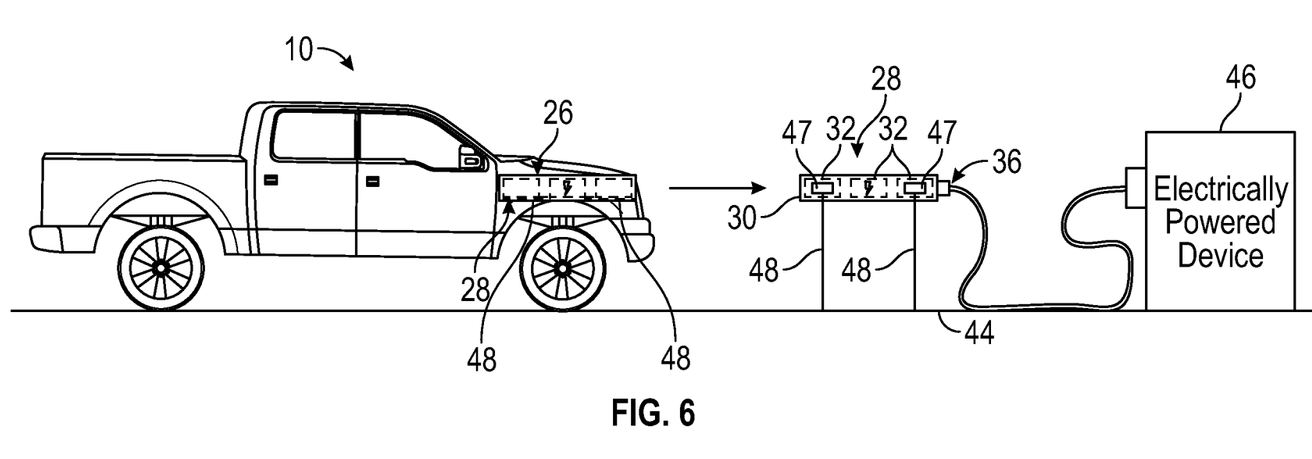
FIG. 6 schematically illustrates removal of a portable power system from a front truck of an electrified vehicle.

Alternatively, as shown in FIG. 6, the entire portable power system 28 may be removed from the front trunk 26. The tray 30 of the portable power system 28 may include handles 47 for removing and handling the portable power system 28. The tray 30 may additionally be equipped with one or more spring loaded legs 48 that are configured to automatically move from a folded position to an unfolded position when the portable power system 28 is removed from the front trunk 26. The spring loaded legs 48 are in the folded position when the portable power system 28 is stowed in the front trunk 26 and may automatically move to the unfolded position when the portable power system 28 is removed from the front trunk 26.

Once removed from the front trunk 26, the portable power system 28 may be positioned on the work surface 44 of a worksite. The user may then plug various electrically powered devices 46 into the power points 36 of the modular battery units 32. The portable power system 28 is capable of supplying a certain amount of electrical power for powering the electrically powered devices 46 once plugged into the power points 36.

Figure 7:
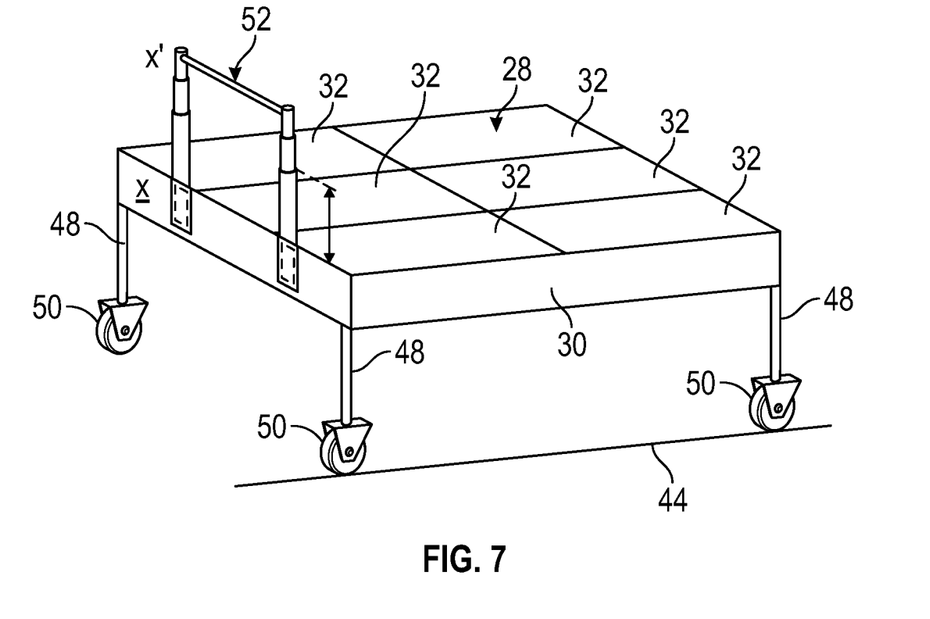
FIG. 7 illustrates select features of a portable power system for a vehicle.

FIG. 7 illustrates additional features that may be implemented into the tray 30 of the portable power system 28. In an embodiment, the spring loaded legs 48 of the tray 30 each include a wheel 50. The wheels 50 allow the user to move (i.e., roll) the portable power system 28 along the work surface 44.

In another embodiment, the tray 30 includes a telescoping handle 52. The telescoping handle 52 may be moved between a retracted position X and an extended position X'. In the extended position X', the telescoping handle 52 may be pushed or pulled in order to move the portable power system 28, such as by rolling the portable power system 28 on the wheels 50 along the work surface 44. Therefore, the wheels 50 and the telescoping handle 52 enable the portable power system 28 to be transported once removed from the front trunk 26.

Figure 8:
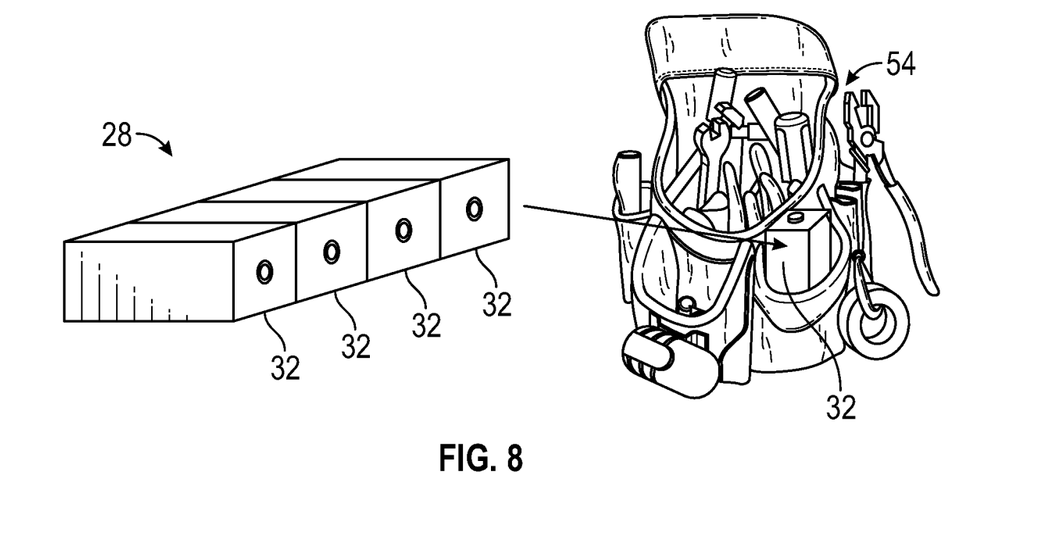
FIG. 8 schematically illustrates removal of a battery unit of a portable power system for providing portable power to hand-held electrically powered devices.

FIG. 8 schematically illustrates yet another exemplary use of the portable power system 28. In this embodiment, the plurality of modular battery units 32 are stackable units. One or more of the modular battery units 32 may be removed from the stack and may be sized small enough for placement within a worker's carrying device 54 (e.g., tool belt, backpack, etc.). The worker can then transport the modular battery unit 32 wherever needed at the worksite without constraint to the portable power system 28 or the electrified vehicle 10. The sizes of the modular battery units 32 provided within the portable power system 28 can be mixed to provide varied energy storage/power source capabilities.

Figure 9:
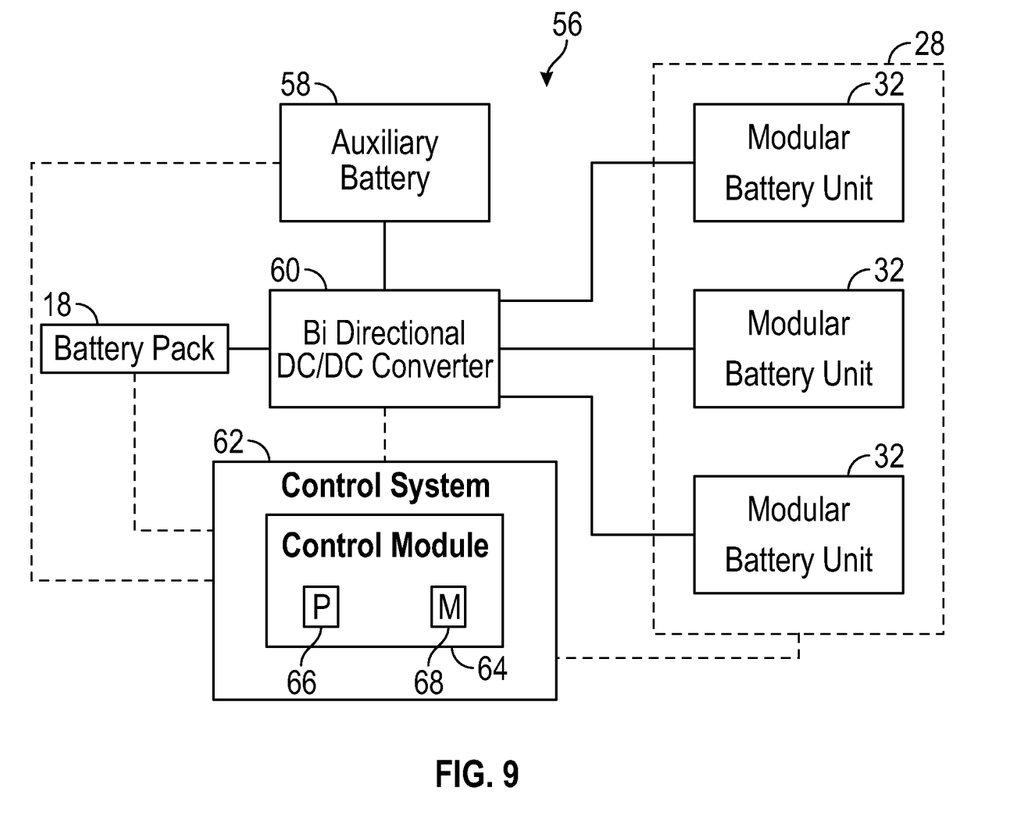
FIG. 9 is a block diagram of a power transfer system of an electrified vehicle.

FIG. 9 is a block diagram illustrating an exemplary power transfer system 56 capable of coordinating the transfer of power between the various energy sources of the electrified vehicle 10. The power transfer system 56 may include the battery pack 18, the portable power system 28, an auxiliary battery 58, a bi-directional DC/DC converter 60, and a control system 62.

In an embodiment, the traction battery pack 18 is a high voltage traction battery pack of the electrified vehicle 10 and is primarily responsible for powering propulsion of the electrified vehicle 10. The battery pack 18 could be a 300V traction battery pack, for example. However, other voltages may also be considered as "high voltage" battery packs.

In an embodiment, the auxiliary battery 58 is a low voltage battery, such as a 12V battery. In this disclosure, the term "low voltage battery" could include any battery that is less than 60V. The auxiliary battery 58 may power various low voltage loads of the electrified vehicle 10. Non-limiting examples of low voltage loads include infotainment systems, lighting systems, power windows, power seats, cooling fan, A/C compressor, instrument clusters, control modules, etc.

The bi-directional DC/DC converter 60 is configured for controlling the flow of power between the battery pack 18, the portable power system 28, and the auxiliary battery 58. In a first embodiment, power from the battery pack 18 may be used to charge the auxiliary battery 58, the modular battery units 32 of the portable power system 28, or both. The bi-directional DC/DC converter 60 may convert a high voltage DC output from the battery pack 18 to a low voltage DC supply that is compatible with the auxiliary battery 58 and/or the modular battery units 32 of the portable power system 28. Each of the modular battery units 32 may be individually connected to the bi-directional DC/DC converter 60 in order to enable charging even when some of the modular battery units 32 are removed from the portable power system 28.

In another embodiment, power from the portable power system 28 may be used to charge the battery pack 18 (i.e., to extend vehicle range) and/or the auxiliary battery 58. The bi-directional DC/DC converter 60 may convert a low voltage DC output from the modular battery units 32 to a high voltage DC supply that is compatible with the battery pack 18.

The control system 62 may control the charging of the battery pack 18, the modular battery units 32 of the portable power system 28, and the auxiliary battery 58 by controlling operation of the bi-directional DC/DC converter 60. For example, the control system 62 may instruct when to begin charging, when to end charging, the length of charging, the power levels of the charging, etc. The control system 62 may be part of an overall vehicle control system or could be a separate control system that communicates with the vehicle control system. The control system 62 may include one or more control modules 64 equipped with executable instructions for interfacing with and commanding operation of various components of the power transfer system 56. For example, in an embodiment, the battery pack 18, the portable power system 28, and the bi-directional DC/DC converter 60 each include a control module, and these control modules can communicate with one another over a controller area network to control charging of the battery pack 18, the portable power system 28, and auxiliary battery 58. In another embodiment, each control module 64 of the control system 62 includes a processing unit 66 and non-transitory memory 68 for executing the various control strategies and modes of the power transfer system 56. The control module 64 of the control system 62 may receive and process various inputs for controlling the transfer of power within the power transfer system 56.

In an embodiment, the control system 62 may be programmed to place limits on when the portable power system 28 can be charged by the battery pack 18. For example, the control system 62 may instruct the bi-directional DC/DC converter 60 to prevent the flow of current from the battery pack 18 to the modular battery units 32 of the portable power system 28 when the current state of charge of the battery pack 18 is below a predefined threshold. In another embodiment, the control system 62 may instruct the bi-directional DC/DC converter 60 to limit the amount of current sent from the battery pack 18 to the portable power system 28 based on an amount of energy required to meet an upcoming expected trip of the electrified vehicle 10. In yet another embodiment, the control system 62 may instruct the bi-directional DC/DC converter 60 to charge the auxiliary battery 58 using power from the portable power system 28 when power is not currently available from the battery pack 18 (e.g., when the state of charge of the battery pack 18 is either too low or user does not want to deplete range).

Figure 10:
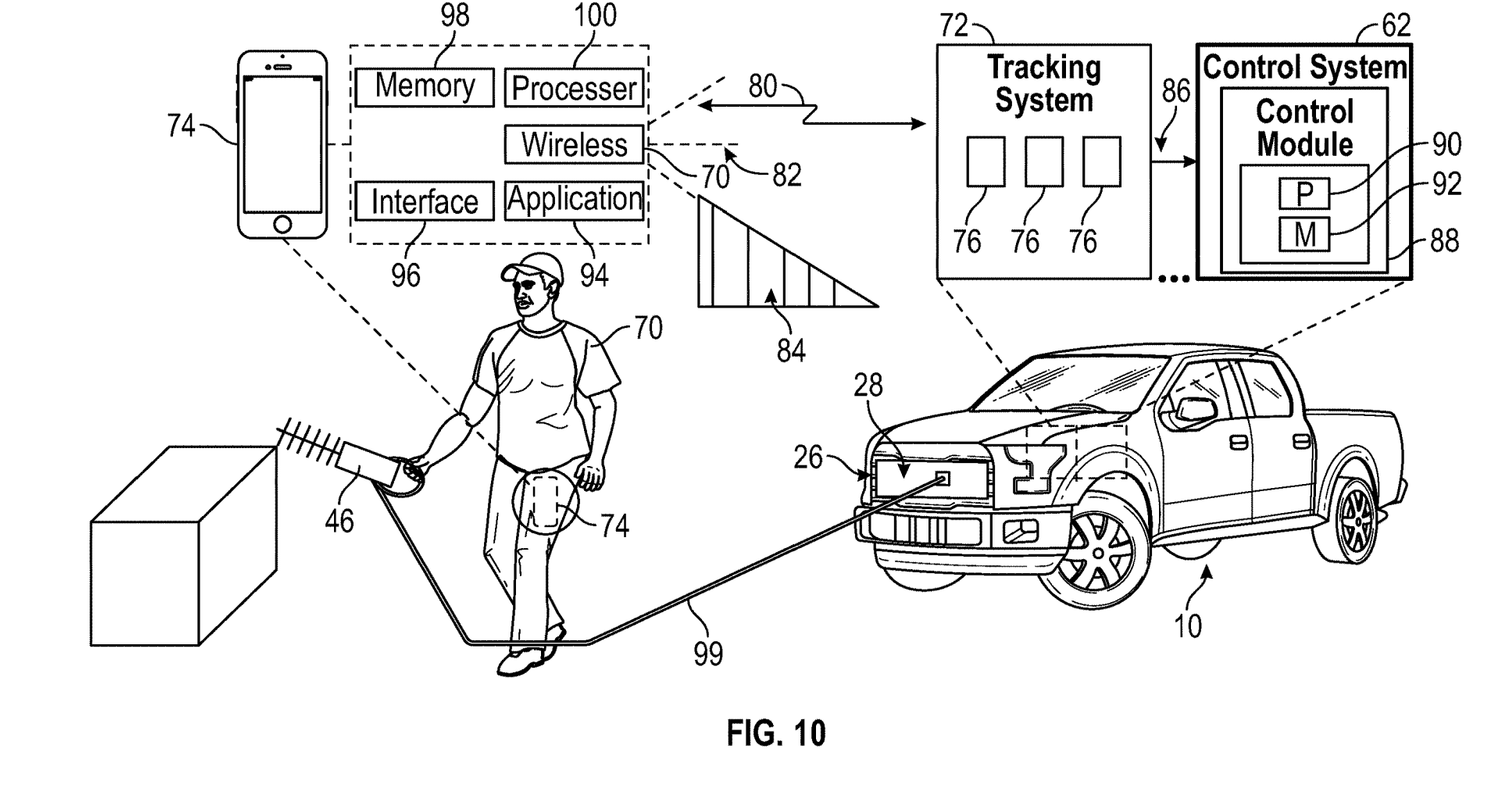
FIG. 10 schematically illustrates a Following Mode of an electrified vehicle.

FIG. 10 schematically illustrates yet another feature that can be implemented into vehicles equipped with the portable power system 28. This feature may be referred to as "Following Mode" and is configured to enable the electrified vehicle 10 to autonomously follow the movement of an operator 70 of an electrically powered device 46 (e.g., a powered lawn tool or any other powered equipment) when the electrically powered device 46 is plugged into the portable power system 28 and the portable power system 28 is stowed within the front trunk 26.

The electrified vehicle 10 may include a tracking system 72 configured to monitor the movement of the operator 70. The tracking system 72 may communicate with a mobile device 74. The mobile device 74 (e.g., a smart phone, tablet, computer, wearable smart device, etc.) in most implementations belongs to the operator 70 or the owner/user of the electrified vehicle 10.

The tracking system 72 may include one or more wireless devices 76 that facilitate the detection of, and the proximity to, the nearby operator 70. The wireless devices 76 may be imbedded or otherwise mounted at various locations of the electrified vehicle 10, such as within the front bumper, rack, molding, doors, in-vehicle components, etc. In an embodiment, the wireless devices 76 are Bluetooth Low Energy (BLE) transceivers configured to receive and/or emit low energy Bluetooth signals for determining the proximity of the operator 70 via the mobile device 74.

As shown schematically, the mobile device 74 associated with the operator 70 may also include a wireless device 78 (e.g., another BLE transceiver) configured to communicate with the wireless device(s) 76 of the tracking system 72 over a wireless connection 80. The wireless connection 80 may be a BLE connection, a Wi-Fi connection, or any other type of wireless connection. In an embodiment, the wireless device 78 of the mobile device 74 is adapted to periodically (e.g., about every half-second or any other time interval) broadcast wireless signals 82 that include information pertinent to the current location of the operator 70, information concerning whether the operator 70 is stationary or moving, etc. The wireless signals 82 may be received by the wireless devices 76 of the tracking system 72. Based on the wireless signals 82, the tracking system 72 is configured to determine the approximate distance and direction of movement of the operator 70 relative to the electrified vehicle 10. For example, in an exemplary embodiment, the approximate distance of the operator 70 from the electrified vehicle 10 can be obtained by measuring a signal strength 84 over the wireless connection 80 between the wireless device 78 of the mobile device 74 and the wireless device(s) 76 of the tracking system 72. This may include the use of various location tracking techniques, including but not limited to proximity, triangulation, and lateration methods. During certain situations, the tracking system 72 may send signals to the control system 62 representative of the location and direction of movement of the operator 70.

The tracking system 72 is in electrical communication with the control system 62, such as over a controller area network (CAN) 86. Based at least in part on the information received from the tracking system 72, the control system 62 can determine the direction and location of the operator 70. In an embodiment, the control system 62 may utilize a tracking technique (e.g., triangulation) to determine the location and direction of movement of the operator 70.

The control system 62 may include a control module 88 equipped with executable instructions for interfacing with and commanding operations of various components of the electrified vehicle 10. The control module 88 may include a processing unit 90 and non-transitory memory 92 for executing the various control strategies or modes of the electrified vehicle 10.

The processing unit 90, in an embodiment, is configured to execute one or more programs stored in the memory 92 of the control module 88. A first exemplary program, when executed, may determine when and how to autonomously move the electrified vehicle 10 to follow the movement of the operator 70 as the operator moves away from the electrified vehicle 10. The first exemplary program is thus a program for executing the Following Mode. In an embodiment, the control system 62 automatically commands the electrified vehicle 10 to autonomously move toward the operator 70 when the operator 70 is positioned at a distance from the electrified vehicle 10 that exceeds a predefined threshold distance.

The mobile device 74 may include an application 94 that includes programming to allow the user to employ a user interface 96 for enabling the Following Mode. The application 94 may be stored in memory 98 of the mobile device 74 and may be executed by a processor 100 of the mobile device 74.

Figure 11:
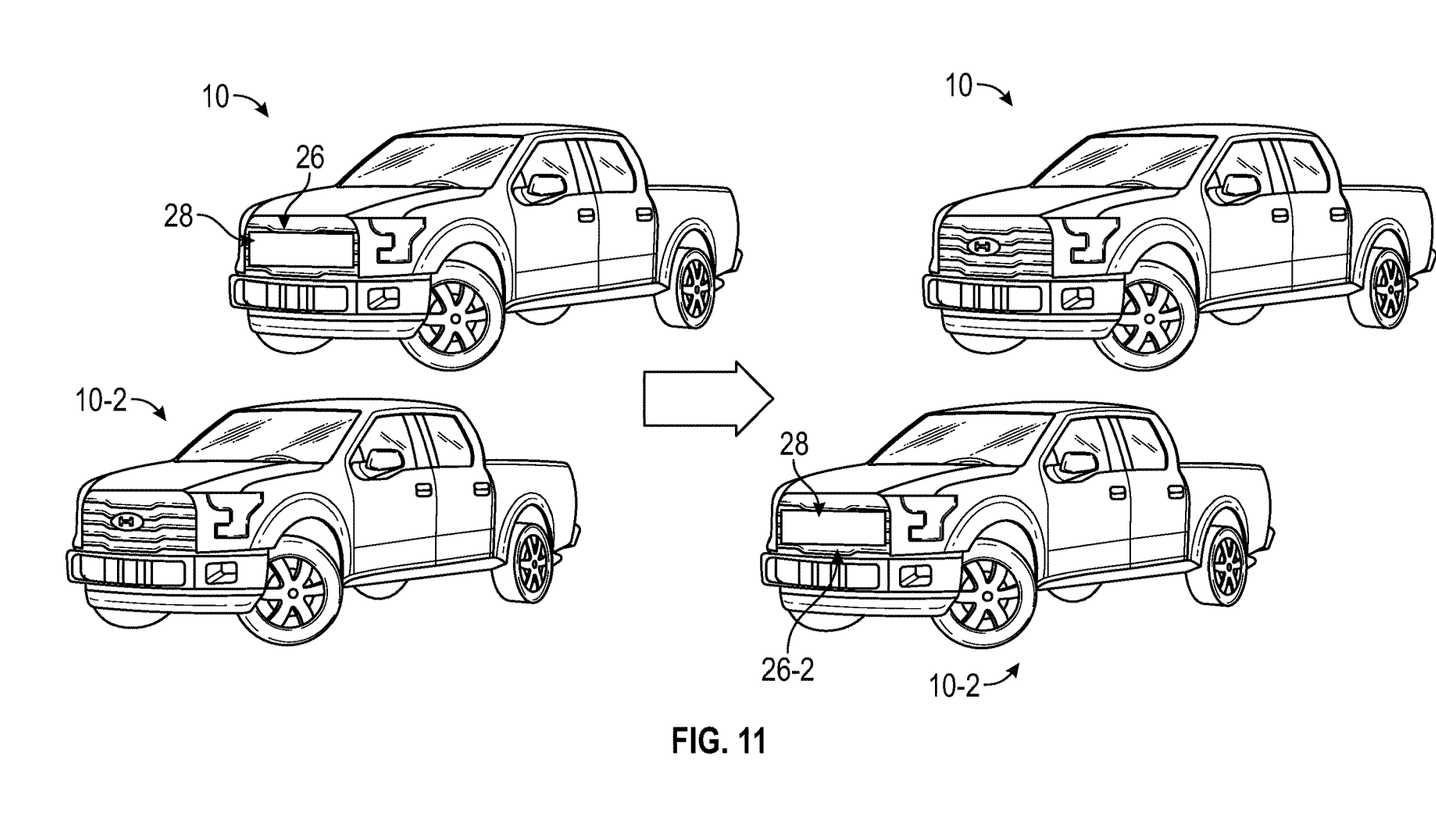
FIG. 11 schematically illustrates removal of a portable power system from a first vehicle for insertion into a second vehicle.

FIG. 11 schematically illustrates the transferability of the portable power system 28, such as from the electrified vehicle 10 to another electrified vehicle 10-2. For example, the portable power system 28 may be removed from the front trunk 26 of the electrified vehicle 10 and then positioned within a front trunk 26-2 of the electrified vehicle 10-2, such as for providing extra driving range to the electrified vehicle 10-2 during an emergency situation. The portable power systems 28 may be rented from dealerships, electric charging stations, etc. for providing flexible and transferrable portable power solutions.

The portable power systems of this disclosure provide alternative energy storage/power source functionality within vehicles. The portable power systems described herein are highly portable and can be utilized either while stored within the vehicle or removed from the vehicle, thereby improving the overall effectiveness of the vehicle's energy management functionality.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle, comprising:
a front trunk;
a portable power system removably positionable within the front trunk,
wherein the portable power system includes a tray and a plurality of modular battery units individually removable from the tray; and
a pivotable grille assembly including a pivotable panel configured to move between a first position in which the portable power system is enclosed inside the front trunk and a second position in which the portable power system is exposed and removable from the front trunk.

2. The vehicle as recited in claim 1, wherein the vehicle is a pickup truck, and further wherein the front trunk establishes a front cargo space of the pickup truck, and a truck bed of the pickup truck establishes a rear cargo space.

3. The vehicle as recited in claim 1, wherein a power point of at least one of the plurality of modular battery units is exposed when the pivotable panel of the pivotable grille assembly is moved to the second position.

4. The vehicle as recited in claim 1, comprising:
a traction battery pack; and
a bi-directional DC/DC converter electrically connected between the traction battery pack and the portable power system,
wherein the bi-directional DC/DC converter is configured to transfer power both from the traction battery pack to the portable power system and from the portable power system to the traction battery pack.

5. The vehicle as recited in claim 4, wherein the bi-directional DC/DC converter is configured to transfer power from the portable power system to an auxiliary battery of the vehicle.

6. The vehicle as recited in claim 4, wherein each of the plurality of modular battery units of the portable power system is individually connected to the bi-directional DC/DC converter.

7. The vehicle as recited in claim 1, wherein the tray of the portable power system includes a spring loaded leg configured to automatically move from a folded position to an unfolded position when the portable power system is removed from the front trunk.

8. The vehicle as recited in claim 7, wherein the tray of the portable power system includes a telescoping handle, and further wherein the spring loaded leg of the tray of the portable power system includes a wheel.

9. The vehicle as recited in claim 1, wherein the portable power system is removable from the vehicle and is insertable into a second front trunk of a second vehicle.

10. The vehicle as recited in claim 1, comprising a control system located on-board the vehicle and configured to command the vehicle into a Following Mode in which the vehicle autonomously moves to follow an operator of an electrically powered device that is plugged into the portable power system.

11. The vehicle as recited in claim 10, comprising a tracking system including a first wireless device configured to communicate with a second wireless device of a mobile device associated with the operator.

12. The vehicle as recited in claim 11, wherein the mobile device is configured to enable the Following Mode through an application stored in a memory of the mobile device.

13. The vehicle as recited in claim 11, wherein the tracking system is configured to estimate a distance of the operator from the vehicle and a direction of movement of the operator based on a signal strength between the first wireless device and the second wireless device.

14. The vehicle as recited in claim 1, wherein the pivotable grille assembly is an integral portion of a front hood assembly that is hingedly attached to the vehicle, and further wherein the front hood assembly is movable between a closed position in which the portable power system is enclosed within the front trunk and an open position in which at least a portion of the portable power system is exposed.

15. A method, comprising:
autonomously moving a vehicle to follow a movement of an operator of an electrically powered device when the electrically powered device is plugged into a portable power system of the vehicle and when the portable power system is stowed within a front trunk of the vehicle,
wherein the vehicle includes a pivotable grille assembly that pivots between a first position in which a power point of the portable power system is enclosed inside the front trunk and a second position in which the power point is exposed for plugging in the electrically powered device.

16. The method as recited in claim 15, wherein the vehicle includes a front hood assembly that is movable between a first position in which the portable power system is enclosed inside the front trunk and a second position in which the portable power system is exposed.

17. The method as recited in claim 15, wherein a tray of the portable power system includes a spring loaded leg, and the spring loaded leg includes a wheel configured for rolling the tray along a ground surface.

18. A vehicle, comprising:
a passenger cabin;
a front trunk located in front of the passenger cabin and configured to establish a front cargo space of the vehicle;
a truck bed located rearward of the passenger cabin and configured to establish a rear cargo space of the vehicle;
a portable power system removably positioned within the front trunk, wherein the portable power system includes a tray and a plurality of modular battery units individually removable from the tray;
a control system located on-board the vehicle and configured to command the vehicle into a Following Mode in which the vehicle autonomously moves to follow a movement of an operator of an electrically powered device that is plugged into the portable power system;
a tracking system located on-board the vehicle and configured to track the movement of the operator; and
a pivotable grille assembly including a pivotable panel configured to move between a first position in which the portable power system is enclosed inside the front trunk and a second position in which the portable power system is removable from the front trunk.

* * * * *